US012786911B2

(12) United States Patent
Ibrahim et al.

(10) Patent No.: US 12,786,911 B2
(45) Date of Patent: Nov. 3, 2026

(54) MITIGATION OF UCI FEEDBACK ERRORS FOR TEMPORAL-SPATIAL-FREQUENCY (TSF)-BASED CHANNEL STATE INFORMATION (CSI) COMPRESSION

(71) Applicant: InterDigital Patent Holdings, Inc., Wilmington, DE (US)

(72) Inventors: Mohamed Salah Ibrahim, Chesterbrook, PA (US); Mihaela Beluri, Jericho, NY (US); Patrick Tooher, Montreal (CA); Ahmet Serdar Tan, London (GB); Yugeswar Deenoo Narayanan Thangaraj, Chalfont, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 185 days.

(21) Appl. No.: 18/794,917

(22) Filed: Aug. 5, 2024

(65) Prior Publication Data

US 2026/0040246 A1 Feb. 5, 2026

(51) Int. Cl.
*H04W 56/00* (2009.01)
*H04B 7/06* (2006.01)
(Continued)

(52) U.S. Cl.
CPC ...... *H04W 56/0015* (2013.01); *H04B 7/0626* (2013.01); *H04W 24/08* (2013.01); *H04W 72/21* (2023.01)

(58) Field of Classification Search
CPC ............. H04W 56/0015; H04W 24/08; H04W 72/21; H04B 7/0626; H04L 1/0026; H04L 1/0029; H04L 25/0254
(Continued)

(56) References Cited

U.S. PATENT DOCUMENTS 12,348,287 B2 * 7/2025 Wu ...................... H04B 7/0641
2021/0194559 A1 * 6/2021 Li ......................... H04W 24/10
(Continued)

FOREIGN PATENT DOCUMENTS

CN 103238303 A * 8/2013 ........... H04L 5/0057
CN 118285136 A * 7/2024 ........... H04L 5/0048
(Continued)

OTHER PUBLICATIONS

R1-2402630, "Study on CSI compression", 3GPP TSG RAN WG1 #116bis, Changsha, Hunan Province, China, Apr. 15-19, 2024, 6 Pages.
(Continued)

*Primary Examiner* — Mahendra R Patel
(74) *Attorney, Agent, or Firm* — Flaster Greenberg, P.C.

(57) ABSTRACT

A wireless transmit/receive unit (WTRU) and method for synchronizing temporal-spatial-frequency (TSF) information for channel state information (CSI) feedback, comprising receiving configuration information which comprises network (NW)-assistance information associated with NW-side TSF sync information and a condition for detecting misalignment between WTRU-side TSF sync information and the NW-side TSF sync information. A misalignment event is determined to occur between the WTRU-side TSF sync information and the NW-side TSF sync information based on the NW-assistance information and the condition for detecting misalignment. A misalignment mitigation action is determined responsive to the determining that the misalignment event has occurred. The misalignment mitigation action comprising resetting the WTRU-side TSF sync information or retransmitting missing uplink control information (UCI). A report is sent. The report comprises an indication that a misalignment event between the WTRU-side TSF sync information and the NW-side TSF sync
(Continued)

100 information has occurred and an indication of the misalignment mitigation action.

20 Claims, 6 Drawing Sheets

(51) Int. Cl.
*H04W 24/08* (2009.01)
*H04W 72/21* (2023.01)

(58) Field of Classification Search
USPC .......................................................... 370/503
See application file for complete search history.

(56) References Cited

U.S. PATENT DOCUMENTS

| | | | | |
|---|---|---|---|---|
| 2021/0376895 | A1* | 12/2021 | Xue | H04B 7/0626 |
| 2022/0224494 | A1* | 7/2022 | Taherzadeh Boroujeni | H04B 17/24 |
| 2022/0311581 | A1* | 9/2022 | Elshafie | H04W 72/0446 |
| 2023/0180020 | A1* | 6/2023 | Gurelli | H04W 16/28 370/329 |
| 2023/0362703 | A1* | 11/2023 | Zhang | H04W 24/10 |
| 2024/0048203 | A1* | 2/2024 | Wang | H04B 7/0632 |
| 2024/0098533 | A1* | 3/2024 | Leng | H04W 24/02 |
| 2024/0397432 | A1* | 11/2024 | Zorgui | H04W 52/367 |
| 2024/0405821 | A1* | 12/2024 | Kadambar | H04B 7/0626 |
| 2025/0373472 | A1* | 12/2025 | Paz | H04L 25/03012 |

FOREIGN PATENT DOCUMENTS

| | | | | | |
|---|---|---|---|---|---|
| KR | 20220007724 | A | * | 1/2022 | H04W 16/14 |
| WO | WO-2021163162 | A1 | * | 8/2021 | H04W 72/54 |
| WO | WO-2024072297 | A1 | * | 4/2024 | H04L 41/16 |
| WO | WO-2024172432 | A1 | * | 8/2024 | H04W 24/10 |
| WO | 2024233622 | A1 | | 11/2024 | |
| WO | WO-2025179022 | A1 | * | 8/2025 | H04W 4/08 |

OTHER PUBLICATIONS

R1-2404654, "Discussion on CSI compression", 3GPP TSG RAN WG1 #117, Fukuoka City, Fukuoka, Japan, May 20-24, 2024, 13 Pages.

3GPP TS 38.211 V17.3.0 , "NR; Physical Channels and Modulation (Release 17)", 3rd Generation Partnership Project; Technical Specification Group Radio Access Network, Sep. 2022, 136 pages.

3GPP TS 38.212 V17.3.0 , "NR; Multiplexing and Channel Coding (Release 17)", 3rd Generation Partnership Project; Technical Specification Group Radio Access Network, Sep. 2022, 201 pages.

3GPP TS 38.213 V17.3.0 , "NR; Physical Layer Procedures for Control (Release 17)", 3rd Generation Partnership Project; Technical Specification Group Radio Access Network, Sep. 2022, 260 pages.

3GPP TS 38.214 V17.3.0 , "NR; Physical Layer Procedures for Data (Release 17)", 3rd Generation Partnership Project; Technical Specification Group Radio Access Network, Sep. 2022, 232 pages.

3GPP TS 38.321 V17.2.0 , "NR; Medium Access Control (MAC) Protocol Specification (Release 17)", 3rd Generation Partnership Project Technical Specification Group Radio Access Network, Sep. 2022, 246 pages.

3GPP TS 38.331 V17.2.0 , "NR; Radio Resource Control (RRC) Protocol Specification (Release 17)", 3rd Generation Partnership Project; Technical Specification Group Radio Access Network, Sep. 2022, 1298 pages.

* cited by examiner

MITIGATION OF UCI FEEDBACK ERRORS FOR TEMPORAL-SPATIAL-FREQUENCY (TSF)-BASED CHANNEL STATE INFORMATION (CSI) COMPRESSION

BACKGROUND

A Channel State Information (CSI) feedback report may include multiple components and may be reported in multiple parts. A key component in the feedback information is a precoding matrix index (PMI), which may be referred to as a codeword index in a codebook and may dominate the overhead associated with the CSI feedback report. A codebook may include a set of precoding vectors/matrices for each rank and the number of antenna ports, with each precoding vector/matrix having its own index, enabling the receiver to convey a preferred precoding vector/matrix index to a transmitter. Such codebook-based precoding may have performance degradation due to its finite number of precoding vectors/matrices as compared with non-codebook-based precoding. However, a major advantage of codebook-based precoding may include a reduction in control signaling/feedback overhead.

SUMMARY

A method performed by a wireless transmit/receive units (WTRU) for synchronizing temporal-spatial-frequency (TSF) information for channel state information (CSI) feedback. The method comprises receiving configuration information, the configuration information comprising network (NW)-assistance information associated with NW-side TSF sync information and a condition for detecting misalignment between WTRU-side TSF sync information and the NW-side TSF sync information. A misalignment event is determined to have occurred between the WTRU-side TSF sync information and the NW-side TSF sync information based on the NW-assistance information and the condition for detecting misalignment. A misalignment mitigation action is determined responsive to the determining that the misalignment event between the WTRU-side TSF sync information and the NW-side TSF sync information has occurred, with the misalignment mitigation action including at least one of resetting the WTRU-side TSF sync information or retransmitting missing uplink control information (UCI). A report is sent. The report comprises an indication that a misalignment event between the WTRU-side TSF sync information and the NW-side TSF sync information has occurred and an indication of the misalignment mitigation action.

The WTRU-side TSF sync information comprises information associated with historical CSI measurements from the WTRU, and the NW-side TSF sync information comprises the information associated with the historical CSI measurements from the WTRU.

CSI reference signal (CSI-RS) transmissions are received from the NW and CSI is generated based on the received CSI-RS transmissions. The WTRU-side TSF sync information is updated based on the CSI, the updating comprising one or more of adding, removing, or replacing historical CSI samples in a buffer.

The configuration information further comprises parameters for a number and a type of historical CSI samples associated with the WTRU-side TSF sync information. The configuration information comprises monitoring parameters for the WTRU-side TSF sync information, wherein the monitoring parameters comprise a monitoring flag that, when set, triggers the WTRU to determine whether a misalignment event between the WTRU-side TSF sync information and the NW-side TSF sync information has occurred.

The misalignment mitigation action comprises performing at least one of a reset of the WTRU-side TSF sync information to a most recent synchronized state with the NW or a partial removal of the WTRU-side TSF sync information.

The NW-assistance information comprises a correlation metric for evaluating a similarity between consecutive CSI samples or an output of an NW action associated with the NW-side TSF sync information. The output comprises at least one of an indication of the NW-side TSF sync information based on received WTRU feedback, an indication of an output of a function performed on the NW-side TSF sync information, an indication of an output of a function performed on the received WTRU feedback, or an indication of a status of an NW-side counter that is updated with every update of the NW-side TSF sync information.

The condition for detecting misalignment between the WTRU-side TSF sync information and the NW-side TSF sync information comprises at least one of a measurement of a correlation between consecutive samples of WTRU-side TSF sync information dropping below a correlation threshold, a comparison of a function of WTRU-side TSF sync information with a function of the NW-side TSF sync information resulting in a value exceeding a configured threshold, reception of a monitoring flag from the NW indicating that the WTRU should start monitoring the WTRU-side TSF sync information for alignment, or a status of a NW-side counter associated with updates to the NW-side TSF sync information indicating a misalignment.

The misalignment event is a first type of misalignment event, wherein the first type of misalignment event indicates that the NW-side TSF sync information was not updated due to missing at least one UCI transmission from the WTRU.

An indication of a network side counter is received, and it is determined that the misalignment event is the first type of misalignment event based on the indication of the network side counter.

The misalignment event is a second type of misalignment event, wherein the second type of misalignment event indicates that both the WTRU and NW update their respective TSF information but the update to the NW side TSF sync information does not match the update to the WTRU-side TSF sync information. It is determined that the misalignment event is the second type of misalignment event based on a comparison between an output of a function based on the WTRU-side TSF sync information and an output of the function received from the network.

A wireless transmit/receive unit (WTRU) comprising a processor. The processor is configured to receive configuration information. The configuration information comprises network (NW)-assistance information associated with NW-side TSF sync information and a condition for detecting misalignment between WTRU-side TSF sync information and the NW-side TSF sync information. A misalignment event is determined to have occurred between the WTRU-side TSF sync information and the NW-side TSF sync information based on the NW-assistance information and the condition for detecting misalignment. A misalignment mitigation action is determined responsive to the determining that the misalignment event between the WTRU-side TSF sync information and the NW-side TSF sync information has occurred. The misalignment mitigation action comprises at least one of resetting the WTRU-side TSF sync information or retransmitting missing uplink control information (UCI). A report is sent. The report comprises an indication that a misalignment event between the WTRU-side TSF sync information and the NW-side TSF sync information has occurred and an indication of the misalignment mitigation action.

The WTRU-side TSF sync information comprises information associated with historical CSI measurements from the WTRU, and the NW-side TSF sync information comprises the information associated with the historical CSI measurements from the WTRU.

The processor is further configured to receive CSI reference signal (CSI-RS) transmissions from the NW and to generate CSI based on the received CSI-RS transmissions. The WTRU-side TSF sync information is updated based on the CSI, the updating comprising one or more of adding, removing, or replacing historical CSI samples in a buffer.

The configuration information further comprises parameters for a number and a type of historical CSI samples associated with the WTRU-side TSF sync information. The configuration information comprises monitoring parameters for the WTRU-side TSF sync information. The monitoring parameters comprise a monitoring flag that, when set, triggers the WTRU to determine whether a misalignment event between the WTRU-side TSF sync information and the NW-side TSF sync information has occurred.

The misalignment mitigation action comprises performing at least one of a reset of the WTRU-side TSF sync information to a most recent synchronized state with the NW or a partial removal of the WTRU-side TSF sync information.

The NW-assistance information comprises a correlation metric for evaluating a similarity between consecutive CSI samples or an output of an NW action associated with the NW-side TSF sync information. The output comprises at least one of an indication of the NW-side TSF sync information based on received WTRU feedback, an indication of an output of a function performed on the NW-side TSF sync information, an indication of an output of a function performed on the received WTRU feedback, or an indication of a status of an NW-side counter that is updated with every update of the NW-side TSF sync information.

The condition for detecting misalignment between the WTRU-side TSF sync information and the NW-side TSF sync information comprises at least one of a measurement of a correlation between consecutive samples of WTRU-side TSF sync information dropping below a correlation threshold, a comparison of a function of the WTRU-side TSF sync information with a function of the NW-side TSF sync information resulting in a value exceeding a configured threshold, reception of a monitoring flag from the NW indicating that the WTRU should start monitoring the WTRU-side TSF sync information for alignment, or a status of a NW-side counter associated with updates to the NW-side TSF sync information indicating a misalignment.

The misalignment event is a first type of misalignment event, and wherein the first type of misalignment event indicates that the NW-side TSF sync information was not updated due to missing at least one UCI transmission from the WTRU.

The processor is further configured to receive an indication of a network side counter, and to determine that the misalignment event is the first type of misalignment event based on the indication of the network side counter.

The misalignment event is a second type of misalignment event. The second type of misalignment event indicates that both the WTRU and NW update their respective TSF information but the update to the NW side TSF sync information does not match the update to the WTRU-side TSF sync information. The processor is further configured to determine that the misalignment event is the second type of misalignment event based on a comparison between an output of a function based on the WTRU-side TSF sync information and an output of the function received from the network.

DETAILED DESCRIPTION

Figure 1A:
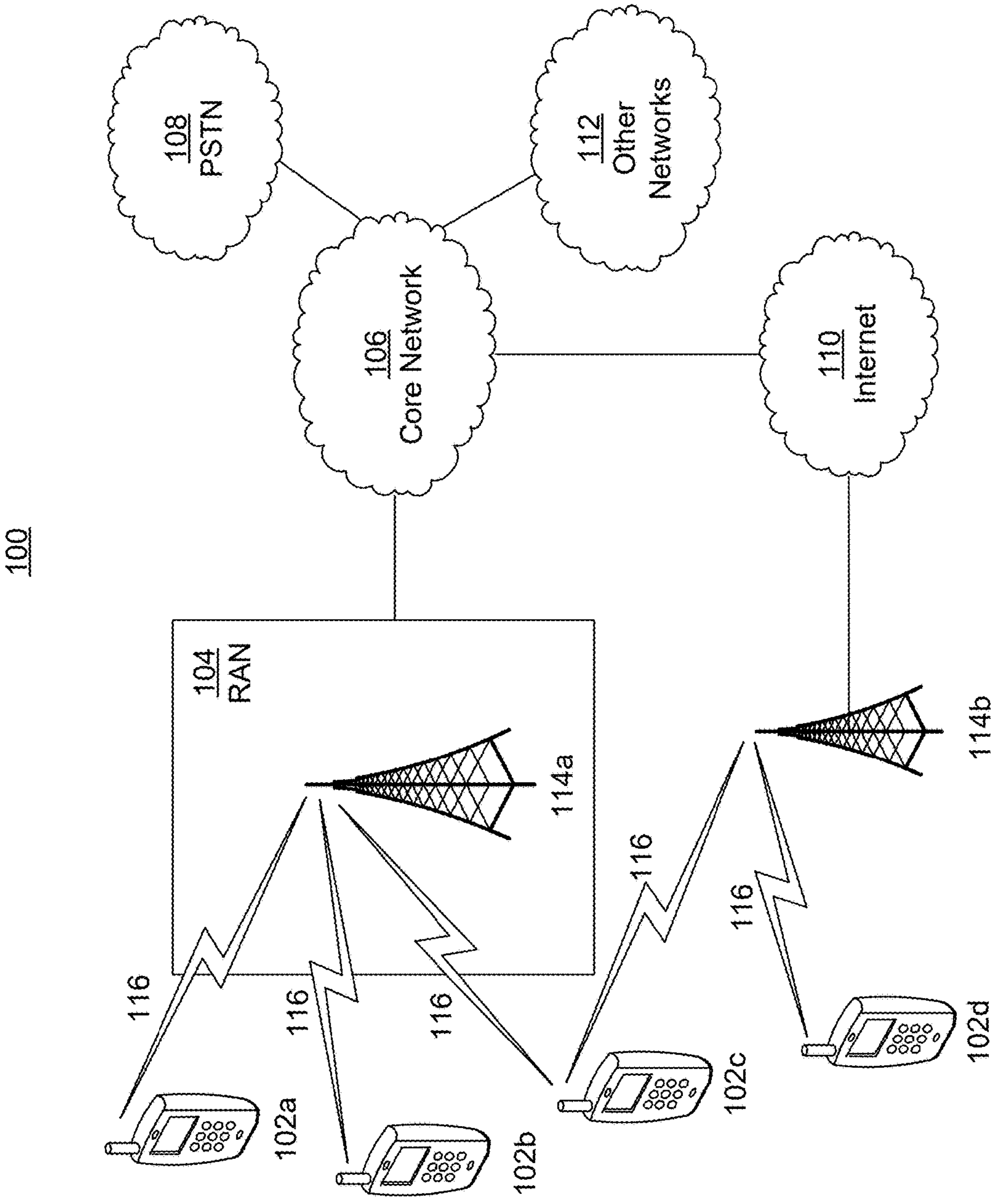
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IOT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a WTRU.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
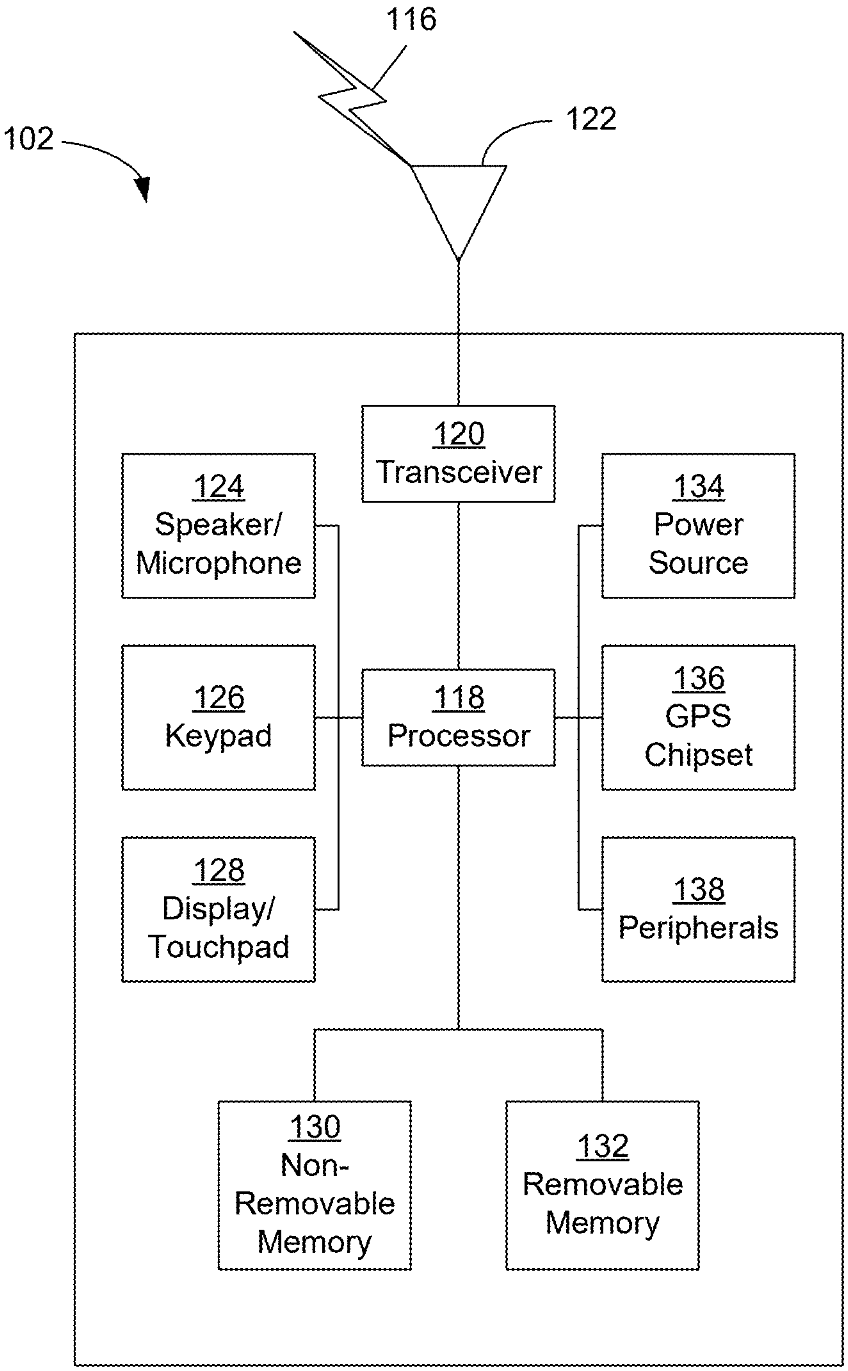
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
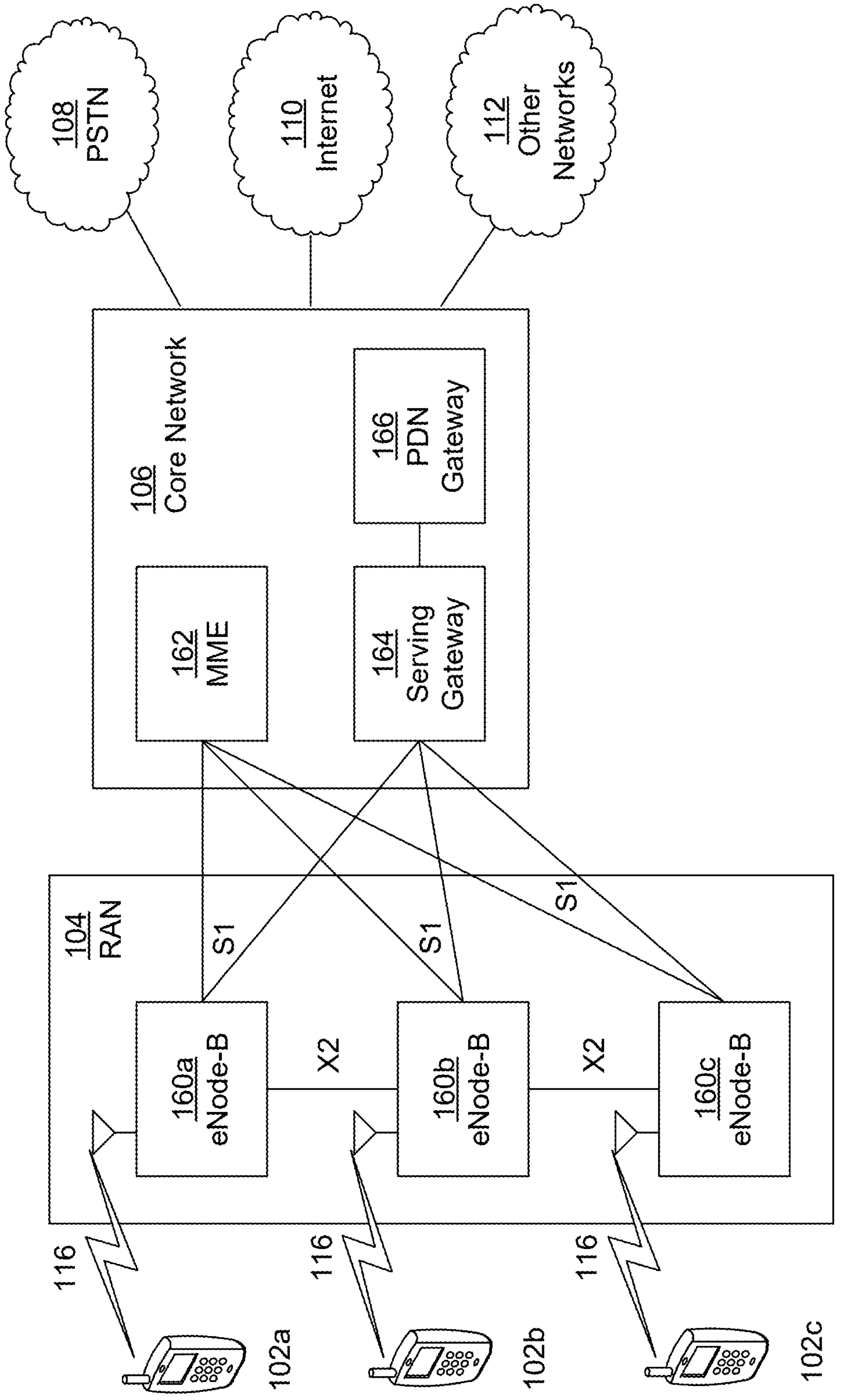
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
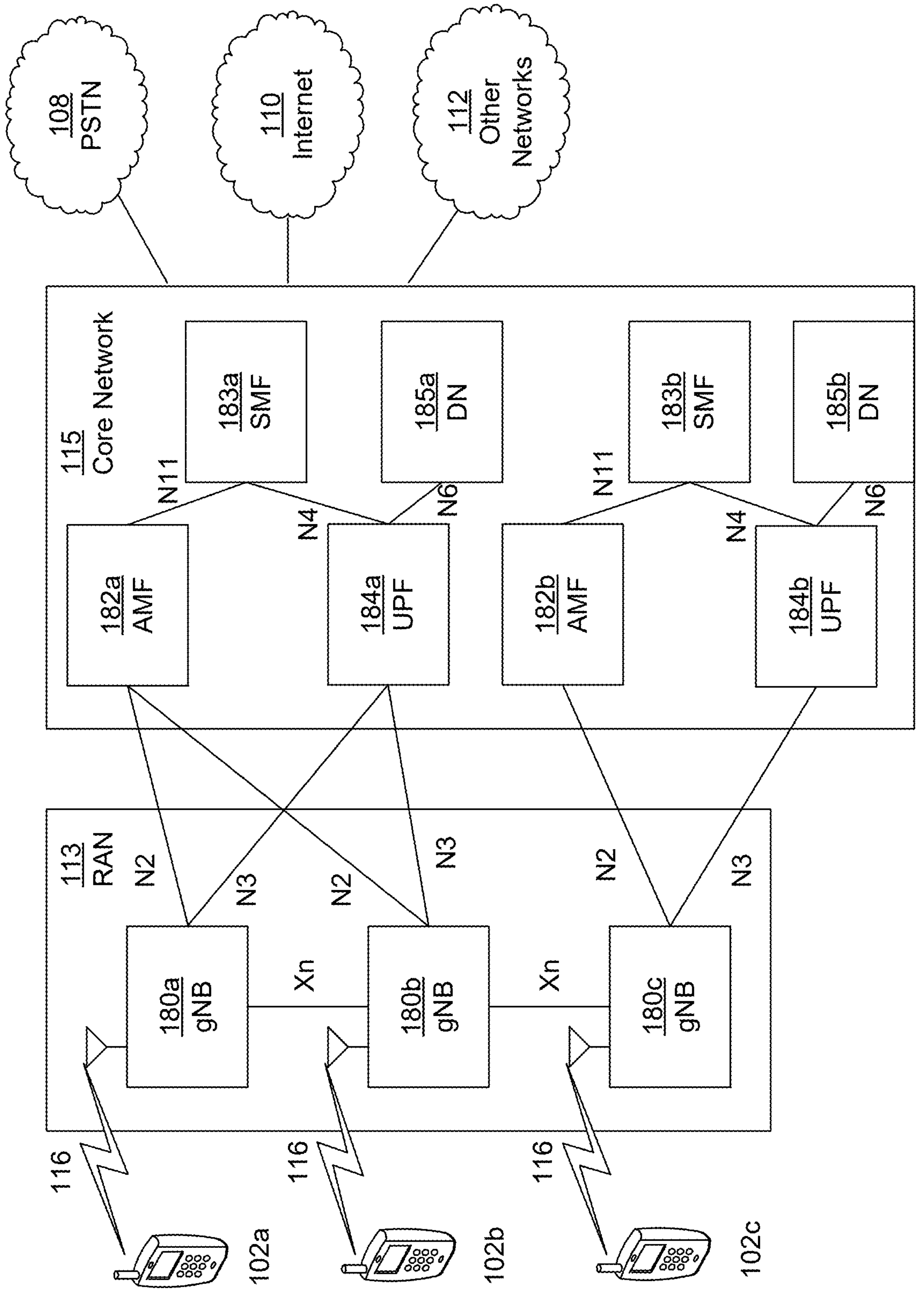
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
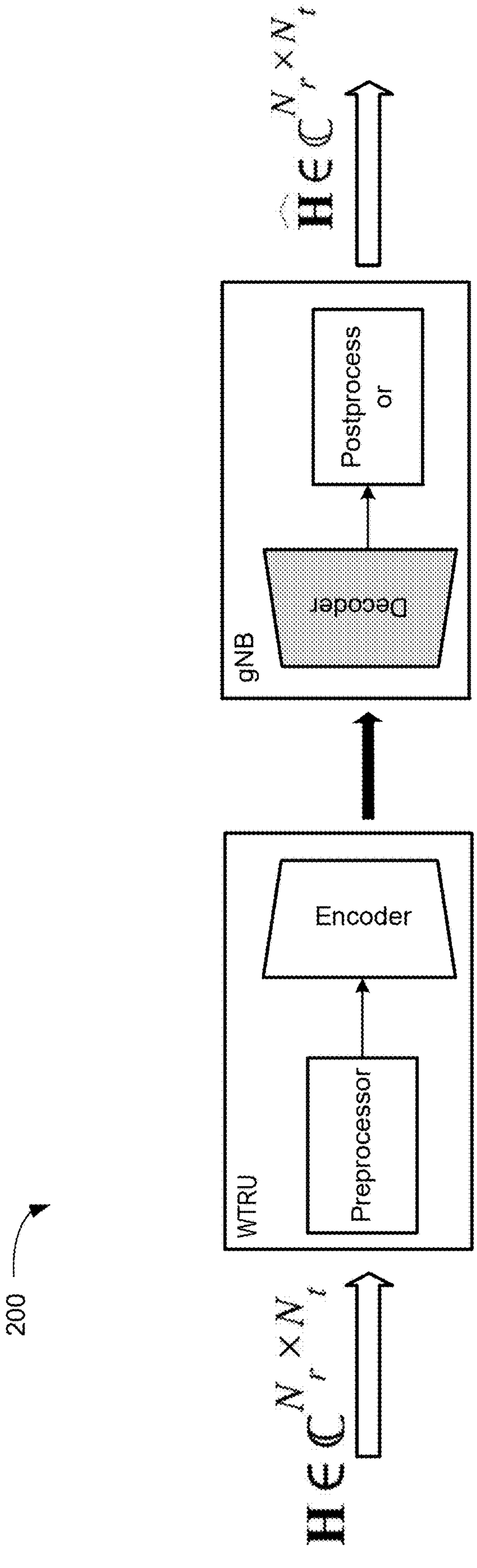
FIG. 2 is a system diagram illustrating an example Artificial Intelligence/Machine Learning (AI/ML) framework for Channel State Information (CSI) compression.

FIG. 2 is a diagram illustrating an example Artificial Intelligence/Machine Learning (AI/ML) framework 200 for Channel State Information (CSI) compression.

Auto-encoders (AE) are a specific class of deep neural networks (DNNs) that arise in the context of an un-supervised machine learning setting. In this setting, high-dimensional data may be non-linearly transformed into a lower dimensional latent vector using a DNN based encoder, and the lower dimensional latent vector may then be used to reproduce the high-dimensional data using a non-linear decoder. The encoder may be represented as $E(x; W_e)$, where x is the high-dimensional input data and $W_e$ is the parameters of the encoder. The decoder may be represented as $D(z; W_d)$ where z is the low-dimensional latent representation and $W_d$ is the parameters of the decoder. The trained encoder $E(x; W_e)$ may be used to compress the high-dimensional data and the trained decoder $D(z; W_d)$ may be used to decompress the latent representation.

The AI/ML framework for CSI compression using AE may include a pre-processor/post-processor and an AI/ML encoder/decoder at the WTRU-side and the Next Generation Node B (gNB)-side, respectively, as illustrated in FIG. 2. An input channel $H \in \mathbb{C}^{N_r \times N_t}$ may be first preprocessed/transformed to another domain before being compressed by the AI/ML encoder. The received compressed channel may then be decompressed by the AI/ML decoder and may subsequently be post-processed to be transformed back to the original domain associated with the input channel H.

Figure 3:
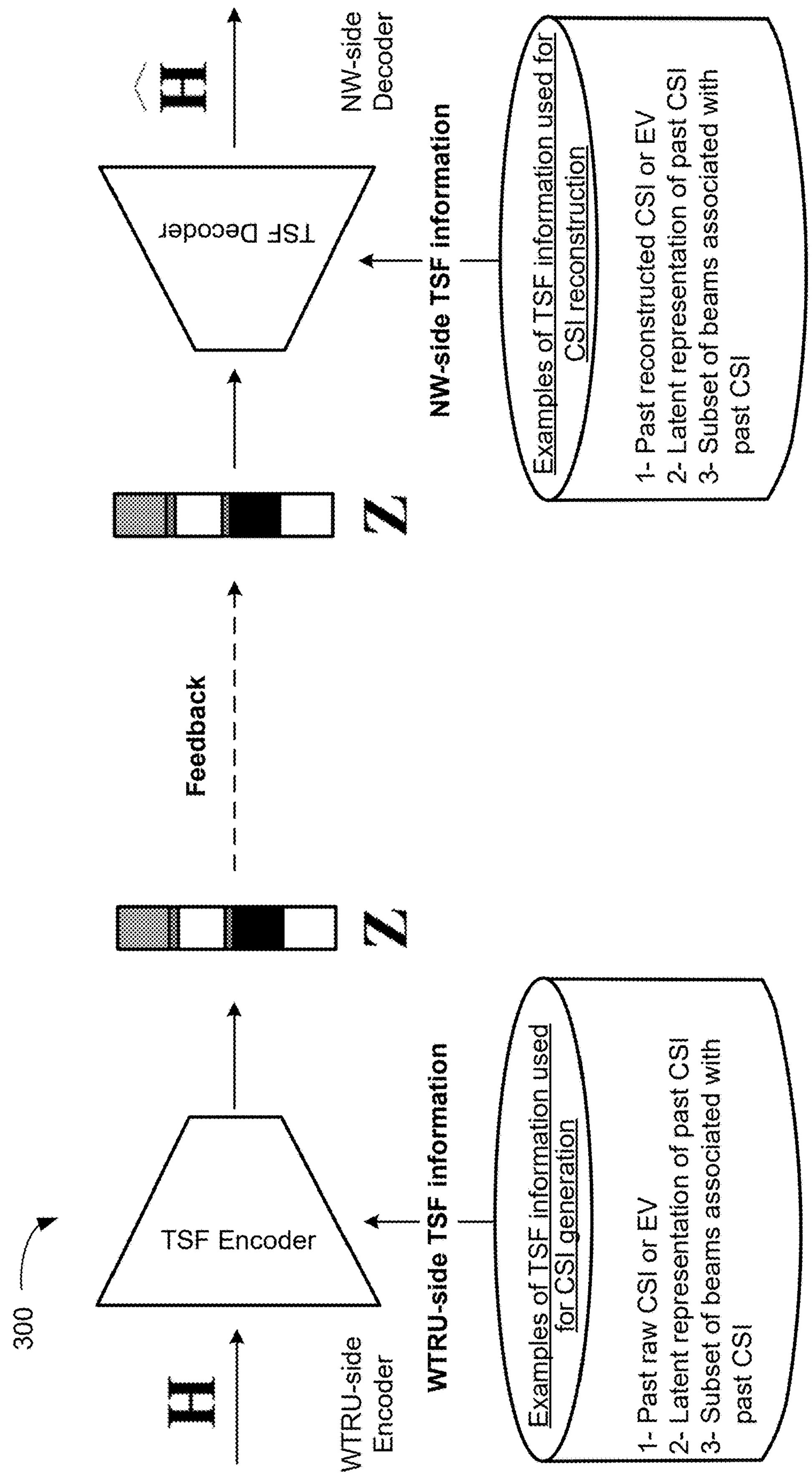
FIG. 3 is a system diagram illustrating an example Temporal-Spatial-Frequency (TSF) compression framework with past CSI or a representation thereof used at both a Wireless Transmit/Receive Unit (WTRU)-side and a network (NW)-side.

FIG. 3 is a diagram illustrating an example Temporal-Spatial-Frequency (TSF) compression framework 300 with past CSI or a representation thereof used at both a Wireless Transmit/Receive Unit (WTRU)-side and a network (NW)-side.

TSF compression may rely on leveraging temporal correlation of CSI samples to improve the compression process relative to spatial-frequency compression. Exploiting the CSI temporal correlation on the top of TSF compression may provide further improvement in the reconstruction performance for a given overhead, a reduction in overhead for a given performance and improvement in both performance and overhead relative to the TSF compression. The usage of a past CSI may be enabled at WTRU-side only, the NW-side only, or both WTRU-side and NW-side. The configuration in which both the WTRU-side and NW-side use past CSI may increase performance since the temporal correlation can be exploited at both communication nodes. The past CSI may be represented and used in different ways by both the WTRU and NW. The terms past CSI and TSF information may be used interchangeably to indicate the historical information, or a representation thereof used by both WTRU and NW in the compression and reconstruction processes.

To fully leverage the TSF compression framework with past CSI available at both the WTRU-side and NW-side, the WTRU-side TSF information and NW-side TSF information may need to be synchronized. However, it is likely that the TSF information can go out-of-sync because of, for example, possible poor uplink channel conditions that may result in missing UCI or UCI errors, which may eventually impact the TSF information at the NW-side. This may result in so-called error propagation, where any missed UCI may propagate the error in the subsequent compression/reconstruction instances which rely on the TSF information.

The examples described herein may enable an efficient TSF framework that may maintain a synchronization of the TSF information at both the WTRU-side and NW-side, detect out-of-sync events between the TSF information, and/or mitigate different levels of misalignments in the TSF information. Examples described herein may provide one or more benefits and/or address problems, including, for example, resolving, mitigating, and/or detecting error propagation problems resulting from possible misalignment in the TSF information at both the WTRU-side and NW-side. Examples described herein may provide benefits including maintaining the synchronization of the TSF information at both the WTRU-side and NW-side. Examples described herein may provide benefits including detecting and differentiating between different misalignment levels of the TSF information at both the WTRU-side and NW-side. Examples described herein may provide benefits including determining a cause of a performance drop in the context of the TSF compression.

Examples described herein may include WTRU procedures for handling the error propagation issue for TSF compression with past CSI available at both the WTRU-side and NW-side.

Examples include WTRU procedures to mitigate the error propagation associated with TSF compression, that may occur due to missing Uplink Control Information (UCI), for systems where both the WTRU and NW are using historical/past CSI for compression and reconstruction of CSI, respectively. For proper operation of the TSF compression, both the WTRU and NW should be in sync regarding the usage of the past CSI. The following procedures are agnostic to the TSF implementation framework and may be considered broadly applicable to handle the error propagation problem associated with TSF compression, with both communication nodes having access to the past CSI or a representation thereof.

The WTRU may receive a configuration (e.g., configuration information) for CSI feedback based on TSF compression with past CSI used at both the NW-side and WTRU-side in the compression process, for example, using an Autoencoder (AE) model. The configuration information may include a WTRU-side TSF synchronization (sync) information configuration. The TSF sync information may include/represent the number and type of historical samples used for CSI generation/reconstruction, wherein the type of historical samples may include raw CSI, eigenvectors, a set of beams, etc. Additionally, the WTRU-side TSF sync information may include the number of feedback report parts and the associated sync information between the WTRU and NW (e.g., two feedback report parts wherein each feedback report part represents specific information about the channel). For example, a single feedback report part may represent the compressed information generated based on the available past CSI along with the current CSI. Additionally, two or more feedback report parts may be used, wherein some feedback report parts capture long-term variations in the channel and other feedback report parts capture short-term variations in the channel. In an example, for TSF compression using Beam Domain Preprocessing (BDP), a first feedback report part may represent a first set of beams, and a second feedback report part may represent a second set of beams.

The configuration information may include WTRU-side TSF sync information monitoring parameters. The WTRU-side TSF sync information monitoring parameters may be configured to ensure proper TSF compression. The WTRU-side TSF sync information should be aligned with the NW-side TSF sync information to ensure proper TSF compression. The WTRU-side TSF sync information monitoring parameters may include a monitoring flag indicating that the WTRU may start monitoring the WTRU-side TSF sync information to determine whether it is in sync with the NW-side TSF sync information. Additionally, the WTRU-side TSF sync information monitoring parameters may include monitoring priority. The monitoring priority may indicate that the WTRU should prioritize one feedback report part over another when monitoring the WTRU-side TSF sync information. The WTRU-side TSF sync information monitoring parameters may include NW-assistance information. The NW-assistance information may include the output of an NW action associated with the NW-side TSF sync information. The NW-assistance information may include an indication of the NW-side TSF sync information based on received WTRU feedback, the output of a function performed on NW-side TSF sync information, the output of a function performed on the received WTRU feedback, and/or a status of an NW-side counter that is updated with every update of the NW-side TSF sync information.

The configuration information may include criteria or conditions for misalignment detection and/or mitigation.

The criteria or conditions may include metrics such as the correlation metric (e.g., Squared Generalized Cosine Similarity (SGCS) between consecutive samples) and/or a metric associated with the TSF sync information (e.g., a predefined function of the WTRU-side TSF sync information). The configuration information may include reporting configuration for uplink (UL) resources for monitoring parameters and sync handling.

The WTRU may receive one or more CSI Reference Signal (CSI-RS) transmissions and may determine the WTRU-side TSF sync information based on the received one or more CSI-RS transmissions. The WTRU may determine WTRU-side TSF sync information based on the received one or more CSI-RS transmissions. The WTRU may determine and report one or more CSI feedback report parts based on the determined WTRU-side TSF sync information and the received one or more CSI-RS transmissions.

The WTRU may determine the alignment status between the determined WTRU-side TSF sync information and the NW-side TSF sync information based on a criterion/condition for misalignment detection and received NW-assistance information. The WTRU may determine whether the WTRU-side TSF sync information is aligned with the NW-side TSF sync information. The WTRU may determine the type of misalignment between WTRU-side TSF sync information and the NW-side TSF sync information. There may be a first misalignment type (e.g., Level-1 misalignment), in which the WTRU updated the WTRU-side TSF sync information, but the NW did not update the NW-side TSF sync information (e.g., because UCI was not received at the NW). This Level-1 misalignment may be determined based on WTRU reception of an indication of a NW-side counter, NW assistance information (e.g., NW counter), and/or reception of a misalignment indication.

There may be a second misalignment type (e.g., Level-2 misalignment), in which both the WTRU and NW update their respective TSF sync information, but the update to the NW-side TSF sync information does not match the update to the WTRU-side TSF sync information (e.g., because of a UCI decoding error at the NW). The Level-2 misalignment may be determined based on a comparison of WTRU-side calculated output of a function based on the WTRU-side TSF sync information (e.g., or transmitted WTRU feedback) to received NW-side calculated output of the function based on NW-side TSF sync information (e.g., or received WTRU feedback at the NW), where the function may include a cyclic redundancy check (CRC) function. The Level-2 misalignment may be determined based on NW configured conditions and/or reception of a misalignment indication.

If misalignment is detected, the WTRU may determine and perform one or more actions to mitigate misalignment in the WTRU-side and NW-side TSF sync information (e.g., based on the type of misalignment and a criterion/condition for misalignment mitigation. These actions may include, for example, performing a reset of the WTRU-side TSF sync information, retransmission of the missing UCI, revisiting the TSF sync information in the latest state where both the WTRU and NW were in sync, performing a partial removal of the WTRU-side TSF sync information, and/or periodically transmitting/resetting of the WTRU-side TSF sync information. The WTRU may report the determined TSF sync information alignment status and/or any mitigation action (e.g., including a report of the updated WTRU-side TSF sync information).

The examples described herein may enable an efficient TSF framework with past CSI (e.g., TSF information) available at both the WTRU-side and NW-side. The examples described herein may detect possible misalignment scenarios in the TSF information, determine the misalignment level, and/or identify the associated actions needed to mitigate the misalignment.

The terms Artificial Intelligence (AI), Machine Learning (ML), Deep Learning (DL), and Deep Neural Networks (DNNs) may be used interchangeably. Methods described herein are exemplified based on learning in wireless communication systems. The methods are not limited to such scenarios, systems, and services and may be applicable to any type of transmissions, communication systems, and/or services. The terms Autoencoder (AE) model, AI/ML model, ML model, and AI model may be interchangeably used to refer to the model used for CSI compression.

In examples, WTRU procedures may handle the error propagation issue for Temporal-Spatial-Frequency (TSF) compression with past CSI available at both WTRU-side and NW-side. Configuration of TSF compression with past CSI may be performed at both communication sides. A WTRU capable of performing CSI compression in the Temporal-Spatial-Frequency domain (e.g., TSF CSI compression) may receive CSI feedback configuration (e.g., including CSI resource and CSI reporting configuration) and configuration for the TSF operation. The configuration for TSF operation may include WTRU-side TSF sync information, monitoring configuration and metrics to detect misalignment between the NW-side and WTRU-side TSF sync information, and/or configuration for reporting the monitoring outcome and synchronization handling.

The WTRU may be configured with temporal domain parameters for the WTRU-side TSF compression model (e.g., the AI/ML TSF CSI encoder). To enable correct reconstruction of the CSI at the NW-side, the historical CSI information used at the WTRU-side (WTRU-side TSF information) and the historical CSI information used at the NW-side (NW-side TSF information) need to be synchronized. The WTRU may receive configuration (e.g., configuration information) for the WTRU-side TSF information, where the configuration may include one or more of the following. The configuration information may include the number of CSI historical samples used for CSI generation/reconstruction, which reflects the temporal properties (e.g., correlation of the channel). For example, the number of CSI historical samples may be upper bounded to match the channel coherence time (e.g., the number of CSI historical samples times the periodicity of the historical CSI measurement resources (CSI-RS) should be smaller than the channel coherence time), to enable better CSI compression. In another example, for fast-varying channels with short coherence time, the number of CSI historical samples may be configured as one, resulting in space-frequency (SF) compression. In another example, the number of CSI historical samples may be limited by the WTRU capabilities (e.g., due to memory size/storage requirements for the CSI historical samples).

The configuration information may include an indication of the type of CSI historical samples. The type of CSI historical samples may be the raw CSI (e.g., the full measured channel matrix), eigenvectors of the measured CSI matrix, and/or a set of beams (e.g., for beam domain preprocessing (BDP) solutions).

The configuration information may include an indication of a TSF multipart (e.g., one or more parts) operation. The TSF multipart may include the number of TSF parts and/or the associated TSF sync information, where each TSF part may represent specific information about the channel. For example, the TSF operation may use a single part that compresses the CSI based on the available past CSI samples and the current measured CSI. The CSI feedback reporting may include a single TSF part. In another example, TSF operation may be configured for two parts, where a first part captures long-term channel variations, and a second part captures short-term channel variations. Separate CSI feedback reports may be used for each part (e.g., potentially with different periodicities for the first part and second part), or a single report may be used to jointly report the first and second part. The WTRU may receive specific configuration information for each part, including, but not restricted to, the number of historical CSI samples for each part and/or bottleneck size for each part. In some examples, the TSF multipart may include TSF compression using beam domain preprocessing (BDP). The TSF compression may be configured for one or more parts, where a first part represents a first set of beams (e.g., with beam indices that change slower in time), while a second part represents a second set of beams (e.g., with beam indices that change faster in time).

The WTRU may be configured with WTRU-side TSF sync information monitoring parameters, for example, to monitor the alignment between the WTRU-side and the NW-side TSF sync information. The WTRU-side TSF sync information monitoring parameters configuration may include one or more of the following. The WTRU-side TSF sync information monitoring parameters configuration may include a monitoring flag. When the monitoring flag is enabled, the WTRU may start monitoring the WTRU-side TSF sync information to determine alignment with the NW-side. The monitoring flag may be enabled/disabled dynamically, e.g., using MAC CE or via DCI. WTRU-side TSF sync information monitoring parameters configuration may include monitoring priority. When configured for TSF multipart operation, the WTRU may receive (e.g., further receive) additional configuration information specifying a priority for monitoring one part over other parts. For example, the WTRU may receive an indication or which part(s) should be prioritized over other parts. For example, the WTRU may (e.g., may only) monitor the TSF sync information for the prioritized part. In another example, the WTRU may receive a priority value for each of the configured TSF parts. For example, the WTRU may monitor the highest priority part for every monitoring occasion, may monitor the second priority part for example every second monitoring occasion, and so on. In some examples, the WTRU may be configured to monitor all parts with equal priority. For example, for each monitoring occasion (e.g., each CSI measurement and compression occasion), the WTRU may monitor the TSF sync information of all parts. The WTRU-side TSF sync information monitoring parameters configuration may include network assistance information. The network assistance information may indicate (e.g., explicitly indicate) the NW action associated with the TSF sync information reported by the WTRU, for example, such as the NW update of the NW-side TSF sync information based on the WTRU CSI feedback or a NW-based counter updated with every update of the TSF sync information.

The WTRU may be configured with (e.g., may receive configuration information indicating) metrics and criteria to determine whether the WTRU-side and the NW-side TSF sync information are misaligned. The configuration information may include one or more of the following. The configuration information may include a correlation metric to measure and report as WTRU assistance information for NW-based determination of the TSF sync information alignment status. The metric may be the cosine similarity (e.g., or generalized cosine similarity or squared generalized cosine similarity) between historical CSI samples, for example between consecutive CSI samples, or between the first and the last historical CSI in the TSF buffer. When the WTRU is configured to determine the misalignment status, the WTRU may further be configured with a threshold corresponding to the configured correlation metric. For example, the WTRU may be configured with a cosine similarity (e.g., or SGCS) threshold for the difference between the measured WTRU-side metric (e.g., cosine similarity) and the NW-side metric. When the difference between the measured metrics exceeds the configured threshold, the WTRU may determine that TSF misalignment occurred. The configuration information may include a metric associated with the TSF sync information. The metric may be a predefined function of the TSF sync information, such as the sum of cosine similarity between every pair of consecutive historical CSI samples. When the WTRU is configured to report assistance information for NW-based TSF sync misalignment detection, the WTRU may report the measured metric corresponding to the WTRU-side TSF sync information. When the WTRU is configured to determine the TSF sync misalignment status, the WTRU may be configured with a threshold corresponding to the difference between the NW-side and the WTRU-side TSF sync information metric.

The WTRU may be configured to report the TSF sync information alignment status, including misalignment type and mitigation when applicable, where the configuration (e.g., configuration information) may include one or more of the following. The confirmation information may include the measured TSF sync misalignment metric. The measured TSF sync misalignment metric may be a correlation metric or the determined value of the predefined function, for example when the WTRU is configured to provide assistance information for NW-based TSF sync misalignment determination. The confirmation information may include the determined TSF sync misalignment status, for example when the WTRU is configured for WTRU-based determination. The confirmation information may include uplink (UL) resources for reporting the measured metrics, and, when configured, the determined TSF sync misalignment status and type.

The WTRU may determine TSF monitoring parameters. The WTRU may determine misalignment levels of TSF information. The WTRU may perform Temporal-Spatial-Frequency (TSF) CSI compression using a two-sided AI/ML model, e.g., Autoencoder (AE). The WTRU-side model is associated with a WTRU-side TSF sync information which is utilized in the CSI generation part, for example, output of the AI/ML encoder, while the NW-side model is associated with NW-side TSF sync information which is utilized in the CSI reconstruction part. The WTRU-side and NW-side TSF sync information may represent a sequence of historical CSI or a processed version of the CSI, e.g., eigenvector samples, or a latent representation of the sequence of samples, or a set of beams capturing the long-term temporal variations of the channel. For proper operation of the TSF compression, both the WTRU-side TSF sync information and the NW-side TSF sync information should be in sync/alignment. In a solution, the alignment/synchronization between the WTRU-side and NW-side TSF sync information may require that the information at both sides should be identical, e.g., if the TSF sync information represents a set of beams or a latent representation of a sequence of CSI samples. In a solution, the alignment/synchronization between the WTRU-side and NW-side TSF sync information may require one or more parameters associated with the TSF sync information to be the same, e.g., if the TSF sync information represents a sequence of historical CSI then the number and indices of CSI samples stored at the WTRU-side need to be aligned with the number and indices of the reconstructed CSI samples at the NW-side.

The WTRU may be configured or indicated to determine and report the alignment status between the WTRU-side TSF sync information and the NW-side TSF sync information. The alignment status may be indicated in different formats. For example, a first format may be a Boolean format indicating whether the TSF sync information is aligned or non-aligned. The WTRU may determine the non-aligned status based on a reception of an explicit indication from the NW. For example, the WTRU may receive a misalignment indication from the NW in a DCI field. In a solution, the WTRU may determine/detect the non-aligned status based on a reception of an implicit indication from the NW. For example, the WTRU may receive a request regarding a specific update to the TSF information, e.g., partial or full flush of the WTRU-side TSF sync information. A second format may be a two-bit format, wherein the first bit indicates whether the TSF sync information is aligned or non-aligned while the second bit indicates different misalignment levels. The second bit may be only indicated if the first bit represents the non-aligned status. In a solution, the second bit indicates one out of two possible misalignment levels: Level-1 misalignment or Level-2 misalignment. Although described with reference to two misalignment levels, any combination of misalignment levels may be used herein.

The misalignment levels can be classified into two levels Level-1 misalignment and Level-1 misalignment. Level-1 misalignment may occur when the WTRU updates the WTRU-side TSF sync information, but NW does not update the NW-side TSF sync information, e.g., because UCI was not received at the NW. In a solution, the WTRU may determine Level-1 misalignment based on WTRU reception of NW indication associated with the TSF sync information. For example, the NW indication may be a counter that is updated and signaled to the WTRU with every reception of the UCI associated with the TSF information update. The WTRU may compare the NW counter with its own counter associated with the WTRU-side TSF sync information and detect misalignment Level-1 if the two counters are not equal. The NW indication may be a one-bit that is signaled to the WTRU with every update in the NW-side TSF sync information. The WTRU may determine Level-1 misalignment if the WTRU updates its TSF sync information but does not receive the one-bit indication of the NW update of the TSF sync information in the next transmission.

Level-2 misalignment may occur when both the WTRU and NW update their respective TSF sync information but the update to NW-side TSF sync information does not match the update to WTRU-side TSF sync information. For example, this may occur when the UCI is received with decoding error. In this case, Level-1 misalignment cannot be detected because the update occurs at both sides and NW indication of the update will be received and the counter may be aligned. In a solution, the WTRU may determine Level-2 misalignment based on a function associated with the TSF sync information. For example, let the WTRU-side TSF sync information and NW-side TSF sync information be denoted as $X_{UE}$ and $X_{NW}$, respectively. The WTRU may compute a function $f(X_{UE})$ and compare it with the indicated value $f(X_{NW})$ computed and transmitted by the NW to the WTRU. The WTRU may determine Level-2 misalignment if the computed difference between $f(X_{UE})$ and $f(X_{NW})$ is greater than a configured threshold. For example, if $X_{UE}$ and $X_{NW}$ represent a set of beams used by the WTRU and NW as the TSF sync information, then the WTRU may determine Level-2 misalignment if there is a difference between $f(X_{UE})$ and $f(X_{NW})$, where $f(\cdot)$ may be any arbitrary function known at both WTRU and NW, e.g., summation of the beam indices, or multiplication of the beam indices. For example, if $X_{UE}$ and $X_{NW}$ represent a sequence of historical samples stored at the WTRU and NW, then the WTRU may determine Level-2 misalignment if the difference between $f(X_{UE})$ and $f(X_{NW})$ is greater than a configured threshold, where $f(\cdot)$ may be the summation across cosine similarity between every pair of consecutive CSI samples in the CSI sequence at the WTRU-side and NW-side. In a solution, the function may include a CRC function.

The WTRU may be configured to provide/report assistance information for NW-side misalignment determination. For example, the WTRU may be configured to provide the measured $f(X_{UE})$ to the NW. In a solution, the WTRU may send its counter for updating the TSF information. The WTRU may be configured to send the counter value with every update to the TSF information and based on a configured periodicity (e.g., every N slots), even though TSF information has not been updated during the N slots. This is for the NW to determine Level-1 misalignment in case of missing UCI.

The WTRU may be configured to determine and/or report the misalignment status if one or more of the following conditions are satisfied. The conditions may be time-based. For example, the WTRU may be configured with time instances or a periodicity to determine and/or report the TSF sync information misalignment status. The conditions may be measurement-based. For example, the WTRU may monitor the TSF sync information and report the misalignment status based on performing measurements associated with the TSF sync information. For example, measurement of the correlation between consecutive CSI samples and report misalignment status if the correlation drops below a correlation threshold. For example, measurement of the correlation between the first and last CSI samples in the TSF sequence and report the misalignment status if the correlation drops below a correlation threshold. For example, measurement of the change in the TSF sync information over a configured period and report misalignment status if the change exceeds a configured threshold.

The conditions may be associated with a change in scenario or configuration. For example, the WTRU may report the TSF misalignment status if there is a change in scenario or configuration, wherein the scenario may include Line-of-Sight (LOS) or Non-Line-of-Sight (NLOS), high speed, low speed, frequency selective, and/or time selective. The configuration may include operating frequency, Bandwidth Part (BWP), activation/deactivation of cells. The conditions may be based on AI/ML model performance monitoring. For example, a WTRU may determine the misalignment status if the AI/ML model performance has changed (e.g., by more than a threshold value). For example, if an AI/ML convergence parameter has changed by more than a threshold value, the WTRU may determine and report the misalignment status. The conditions may be based on when AI/ML model training/re-training/fine-tuning occurs or is triggered.

The WTRU may make a determination of a performance drop cause of TSF compression and may perform TSF performance monitoring. The WTRU may monitor the performance of Temporal-Spatial-Frequency (TSF) compression. The performance monitoring may be periodic, aperiodic, semi-persistent, based on measurement, based on WTRU-determined triggers, or upon request from the Network (NW). The WTRU may determine TSF compression performance based on at least one of the following: compression error, reconstruction error, compression rate, and/or effect on expected Block Error Rate (BLER) due to compression error.

The WTRU may determine TSF compression performance based on compression error. Compression error may be determined based on the difference between the outcome of the decompressed CSI and uncompressed CSI. The uncompressed CSI may be defined as at least one of: Rank Indicator (RI), Channel Quality Indicator (CQI), Precoding Matrix Indicator (PMI), Layer Indicator (LI), complete channel matrix, eigenvectors, or eigenvalues. In another example, the compression error may be determined based on the difference between the outcome of the decompressed CSI using a first set of TSF parameters and the outcome of the decompressed CSI using a second set (e.g., a reference set) of TSF parameters. The decompressed CSI may be determined based on assistance from the NW/gNB or may be determined at the WTRU (e.g., via a proxy decompressor).

The WTRU may determine TSF compression performance based on reconstruction error. Reconstruction error may be determined, for example, by calculating the Squared Generalized Cosine Similarity (SGCS) between original CSI and reconstructed CSI. The WTRU may determine TSF compression performance based on compression rate. Compression rate may refer to the highest or lowest compression rate achievable for an allowable compression or reconstruction error. The WTRU may determine TSF compression performance based on expected BLER. The effect on expected BLER due to compression error may also be considered in performance monitoring.

The WTRU may begin performance monitoring based on one or more triggers. The WTRU-determined triggers to begin performance monitoring may include at least one of the following: measurement, HARQ-ACK or HARQ-NACK determination or indication, change in configuration or scenario, and/or reception of indication from gNB.

For measurement-based triggers, the WTRU may initiate performance monitoring based on the value of one or more CSI measurements on CSI-RS. In another example, the WTRU may be triggered to begin performance monitoring based on WTRU speed, Angle of Arrival (AoA), Angle of Departure (AoD), Doppler shift, Doppler spread, delay spread, and/or average delay. HARQ-ACK or HARQ-NACK triggers may involve initiating performance monitoring based on determining one or more HARQ-NACKs.

For changes in configuration or scenario, the WTRU may initiate performance monitoring where a configuration may include at least one of: the number or set of transmit or receive antennas/ports, Bandwidth Part (BWP) ID or BWP size, operating beam(s), and/or serving cell(s). The scenario may include at least one of: WTRU speed, Line-of-Sight (LOS)/Non-Line-of-Sight (NLOS), licensed/unlicensed spectrum, Carrier Aggregation, and/or Dual Connectivity. In some examples, the trigger may be the reception of an indication from a gNB. The indication from the gNB may be explicit (e.g., an information element in a DCI, MAC CE, or RRC) or implicit (e.g., associated with an MCS/TBS value, an RNTI used to decode PDCCH, a CORESET or search space used for reception of PDCCH candidate, or a change in BWP).

The WTRU may determine that TSF compression performance has dropped based on at least one of the following: comparison to threshold, the number of HARQ-NACKs, and/or comparison to a previously determined performance. Comparison to a threshold may involve configuring the WTRU with a threshold and determining that a performance drop has occurred if the TSF compression performance (e.g., the compression error) is less than the threshold. In another example, the WTRU may compare the achievable TSF compression rate, and if it is higher than a threshold, the WTRU may determine a performance drop. If the number of HARQ-NACKs is greater than a threshold, the WTRU may determine a drop in performance. For comparison to a previously determined performance, the WTRU may compare the current TSF compression performance to a previously determined TSF compression performance, and if the difference is greater than a threshold, the WTRU may determine a performance drop.

A WTRU may maintain a counter of performance drop events, which may be defined as instances where one of the above performance drop determinations occur. A WTRU may determine a performance drop when the counter of performance drop events is greater than a possibly configurable value N. The WTRU may determine a performance drop when the number of performance events exceeds N in a particular time period. For example, the WTRU may start (e.g., or restart) a timer when a performance drop event is determined. The WTRU may reset the counter to zero when the timer reaches a possibly configurable value T. In another example, a WTRU may start a timer when N performance drop events are determined. The WTRU may determine a performance drop when the timer (e.g., completely) expires. While the timer is running, the WTRU may count instances where a TSF performance monitoring action determined that there is no performance error or performance drop. The WTRU may stop the timer if it determines M (e.g., where the value of M may be configurable) instances where the TSF performance monitoring did not indicate a performance drop or performance error. The WTRU may reset the counter of instances where performance monitoring action determined that there is no performance error or performance drop when the timer is started or stopped.

A WTRU may determine a cause for a TSF performance drop, which may include at least one of the following. The cause for a TSF performance drop may be a misalignment. A misalignment may be where the WTRU-side TSF sync information is misaligned with the NW-side TSF sync information. The cause for a TSF performance drop may be a quality of historical measured CSI. The historical measured CSI used for TSF compression may be of low or poor quality (e.g., may have low correlation), where the effects of poor historical measured CSI quality may be mitigated by emptying the historical CSI buffer and/or by a subsequent increase in historical measured CSI quality. The cause for a TSF performance drop may be a performance of the AI/ML model. The AI/ML model for compression and/or decompression may perform poorly in current scenario/configuration.

The WTRU may determine that the cause of performance drop is due to misalignment based on detected or determined misalignment between WTRU-side TSF sync information and NW-side TSF sync information. The WTRU may request and/or receive NW-side TSF sync information to determine if there is misalignment. The WTRU may be triggered to report WTRU-side TSF sync information when it determines that there is a TSF performance drop. This may enable the NW to determine if misalignment is the cause of the TSF performance drop.

The WTRU may determine that the cause of the TSF performance drop is due to the quality of historical measured CSI. For example, the WTRU may determine the correlation between one or more consecutive CSI measurements. The WTRU may compare the determined correlation to a threshold. If the correlation is less than the threshold, the WTRU may determine that the quality of historical measured CSI is poor or low. The correlation metric may be configured and may include SGCS between one or more consecutive CSI measurements. The WTRU may request to flush a historical CSI buffer at both the WTRU and NW (e.g., based on the determination that historical measured CSI quality is low). The WTRU may determine and request a new set of TSF compression parameters (e.g., historical buffer size) based on the determined quality of historical measured CSI. For example, the WTRU may determine that the quality of historical CSI is lower than a threshold. The WTRU may determine that TSF performance may be improved by using fewer historical measured CSI. In another example, the WTRU may determine that the quality of historical measured CSI is greater than a threshold. The WTRU may determine that TSF performance may be improved by using more historical measured CSI.

The WTRU may determine that the TSF performance drop is due to the performance of the AI/ML model (e.g., encoder/compressor, decoder/decompressor, or both) being below requirements. For example, the WTRU may obtain CSI measurements and determine whether they are out-of-distribution or in-distribution. The WTRU may count the number of out-of-distribution measurements, and if the count is greater than a threshold, the WTRU may determine that the performance of the AI/ML model is below the requirements. The WTRU may determine whether the AI/ML performance is acceptable based on the above, or at least one of: out-of-range parameters, speed, Signal-to-Interference-plus-Noise Ratio (SINR), CSI measurements, time (e.g., time since last AI/ML model update or validation or selection or training or retraining), scenario, and/or configuration.

A WTRU may report that it has determined a TSF compression performance drop (e.g., or performance error). The report may include at least one of the following additional information: WTRU-side TSF synchronization (sync) information, request of NW-side TSF sync information, indication of type of TSF performance error, indication of TSF performance value or TSF performance error, request to flush the historical CSI buffer at WTRU-side and NW-side, WTRU-determined and applied change in TSF compression parameters, requested change in TSF compression parameters, requested change in AI/ML TSF compression model, requested retraining of AI/ML TSF compression model, indication of current WTRU scenario/configuration, measurements associated with TSF performance error determination, and/or a cause of TSF performance drop.

The WTRU may report the TSF performance drop and/or any of the above additional information in Uplink Control Information (UCI), Medium Access Control Control Element (MAC CE), or Radio Resource Control (RRC). The method to report may depend on the cause of the performance drop. For example, if the drop is due to a first determined cause (e.g., misalignment), the WTRU may report it using UCI. For example, if the drop is due to a second determined cause (e.g., performance of AI/ML model), the WTRU may report it using RRC.

The WTRU may perform mitigation actions for handling misalignment events. A WTRU capable of TSF-based CSI compression may be configured to perform misalignment mitigation of TSF sync information if the WTRU detects misalignment. The WTRU may perform one or more of the actions below based on the misalignment type (e.g., Level-1 or Level-2 misalignment) and criteria or condition for misalignment mitigation.

The WTRU may perform a reset of the WTRU-side TSF sync information if the WTRU detects misalignment of TSF sync information or if the WTRU receives a reset command from the NW. For example, for the reset operation, the WTRU may reinitiate the state of the TSF encoder to an initial condition where the initial condition may be preconfigured. If configured, the WTRU may indicate the reset of the TSF sync information to the NW. The indication of reset of TSF sync information can be explicit (e.g., sent as a new message in an uplink channel) or can be implicit (e.g., depending on a NW indication on misalignment). The WTRU may detect misalignment of TSF sync information and report this detection to the NW. Then, based on the response of the NW to the report, the WTRU may perform a reset of the TSF sync information.

The WTRU may retransmit missing UCI to the NW based on an indication from the NW on misalignment. The WTRU may predict a missing UCI based on the channel conditions. Then, based on the response of the NW to the report, the WTRU may perform retransmission of the missing UCI. The WTRU may detect a missing UCI based on a NACK received from the NW if the WTRU sent the UCI over the data channel; in this example, the WTRU may retransmit the missed UCI.

The WTRU may revisit the latest state prior to the state where the TSF sync misalignment has been detected. In this misalignment mitigation method, the WTRU discards the state of the TSF encoder where misaligned TSF sync information was detected and reverts the TSF encoder state back to the previous state. Based on the configuration or indication from the NW, the WTRU may either re-encode the input (e.g., channel matrix or processed channel matrix) with the missing UCI (e.g., UCI retransmission) or discard the input with missing UCI and encode the next input.

The WTRU may revert the TSF sync information to any previous TSF state based on the indication from the NW or a decision by the WTRU. In this misalignment mitigation method, the WTRU may discard all previous TSF states up to a reference state. The reference state may be determined by the WTRU or indicated by the NW. The WTRU may revert to the previous reference state and continue to encode the inputs. If the WTRU is configured to determine the previous reference state, then the WTRU feeds back the determined previous reference state to the NW, e.g., an index for the reference state. The WTRU may determine a previous reference state based on the similarity of channel conditions during the encoding with the reference state and the state with misalignment.

The WTRU may periodically reset the WTRU-side TSF sync information. The periodicity of the reset can be configured or indicated by the NW. The WTRU may determine the periodicity of the reset based on the channel conditions (e.g., speed, Doppler, rate of change of channel). If the WTRU is configured to determine the periodicity of the reset of TSF sync information, then the WTRU may report the determined periodicity to the NW. In one solution, at each UCI report, the WTRU may include a flag (e.g., a one-bit flag) to indicate the reset of the WTRU-side TSF sync information (e.g., if the flag is set to one, it indicates reset).

The example misalignment mitigation methods listed above may be applicable depending on the misalignment type. For example, in the case of Level-1 misalignment where the WTRU detects the missing UCI, the WTRU may perform retransmission of the missing UCI or revisit the TSF sync information to the latest state. In the case of Level-2 misalignment where the NW-side TSF sync information does not match the update to WTRU-side TSF sync, the WTRU may perform actions such as resetting the TSF sync information, periodically resetting the TSF sync information, or reverting to an indicated previous state.

The WTRU may perform detection of the misalignment of the TSF sync information. For example, the detection output may indicate the misalignment type. The WTRU may report the misalignment detection event to the NW for receiving indications on the mitigation methods. After the reporting of misalignment, the WTRU may receive indications on the mitigation methods from the NW.

The WTRU may perform mitigation measures when it omits a portion of the CSI reporting, for example, due to CSI omission rules when UCI is reported on PUSCH. In this case, the WTRU may perform predefined mitigation measures, such as resetting the WTRU-side TSF sync information or revisiting the latest state of the WTRU-side TSF sync information (e.g., where the WTRU-side and NW-side are in sync). When the WTRU drops a CSI report due to CSI omission rules, both the NW-side and the WTRU-side apply the same (e.g., predetermined) mitigation method at the next CSI reporting occasion.

The WTRU may report the mitigation actions and monitoring parameters. The WTRU may be configured to monitor the CSI compression to ensure that WTRU-side operations are synchronized with the gNB-side operation. The WTRU may be configured to perform monitoring for cases where the WTRU and/or gNB use historical information for CSI compression (e.g., TSF or the like). For example, the WTRU may be configured to monitor and/or ensure the size of the WTRU-side history buffer is aligned with the gNB-side. For example, the WTRU may be configured to monitor and/or ensure that the samples in the WTRU-side history buffer are aligned with the gNB-side. In a solution, the WTRU may determine if the WTRU and gNB are aligned. If misalignment is detected, the WTRU may further determine the level of misalignment. For example, a first level may be associated with a missing TSF update at the NW. A second level may be associated with an incorrect TSF update at the NW. A third level may be associated with mismatched parameters for CSI compression, wherein the parameters may include one or more of: AI/ML model ID used for compression, preprocessing configuration (e.g., Beam Domain Preprocessing configuration), post-processing configuration (e.g., quantization), etc.

The WTRU may be configured with one or more measurements and/or metrics associated with TSF sync information. For example, the WTRU may be configured to report TSF misalignment metrics, such as a correlation metric. The WTRU may be configured to report a metric calculated based on a preconfigured function (e.g., a cosine similarity function) wherein the calculated metric may be a function of TSF sync information. In one solution, the WTRU may be configured to report such measurements and/or metrics in UCI. In one solution, the WTRU may be configured to report such measurements and/or metrics in MAC CE. For example, the WTRU may report the metrics periodically. The WTRU may report the metric when the length of the TSF history buffer is above a threshold. The WTRU may report the metrics periodically or upon request from gNB, possibly in an aperiodic request (e.g., in a DCI).

The WTRU may be configured to report the status of TSF synchronization/alignment. The WTRU may be configured to report TSF synchronization/alignment status periodically, possibly based on a preconfigured timer. The WTRU may be configured to report TSF synchronization/alignment status along with the CSI report. For example, the WTRU may indicate the TSF synchronization/alignment status with every N CSI reports. The value of N may be preconfigured or may be a function of CSI-RS periodicity or the rate of number of misalignments within a preconfigured time interval. The WTRU may be configured to report TSF synchronization/alignment status based on one or more preconfigured trigger conditions. The WTRU may include one or more TSF sync information measurements and/or metrics along with the report.

The WTRU may be configured to report WTRU-side TSF sync information. TSF sync information may include the status of the TSF history buffer, an update to the TSF history buffer, and the length of the TSF history buffer.

The WTRU may be configured to monitor the alignment of TSF synchronization with the gNB. The WTRU may be configured to detect the level of misalignment. Multiple levels of misalignment may be defined, with each level defined in terms of the extent of misalignment, type of misalignment (e.g., misalignment at the WTRU-side, misalignment at the gNB-side, or misalignment at both WTRU-side and gNB-side), and impact of misalignment (e.g., small, medium, or large impact on the performance of compression). The WTRU may be configured to report the level of misalignment to the gNB. The WTRU may indicate the misalignment in UCI, MAC CE, and/or in a Scheduling Request (SR).

The WTRU may be configured to reset the TSF history buffer based on a preconfigured trigger condition. The WTRU may reset the TSF history buffer upon detection of misalignment. The WTRU may be configured to indicate/report the reset (e.g., a TSF reset indication) of the TSF history buffer. The WTRU may transmit the TSF reset indication in UCI or MAC CE, or may transmit an SR on a preconfigured resource to report the TSF reset indication.

The WTRU may be configured to perform one or more mitigation actions upon detection of misalignment in TSF sync information. The WTRU may be configured to report one or more aspects related to the mitigation of misalignment. The WTRU may report mitigation actions taken by the WTRU or may report an indication to enable gNB-based alignment mitigation. The WTRU may indicate the mitigation action taken using one or more of the following indications: a Boolean indication of whether the TSF sync information, history buffer, and/or parameters are aligned between WTRU and NW; an indication of whether the WTRU has reset its TSF sync information and/or history buffer; an indication of change in length of TSF sync information; and/or an indication of change in TSF sync information associated with a previous reporting instance.

The WTRU may mitigate the misalignment by retransmitting one or more of the previous CSI and/or UCI. The WTRU may determine that one or more previous CSI and/or UCI were not successfully received at the gNB. The WTRU may receive an uplink (UL) grant to retransmit the previous CSI and/or UCI. The WTRU may be configured to multiplex the retransmitted UCI in a Physical Uplink Shared Channel (PUSCH) grant. The WTRU may retransmit the UCI based on a preconfigured condition. The WTRU may be configured to multiplex the retransmitted UCI in a PUSCH grant if the size of the grant is above a preconfigured threshold. The WTRU may be configured with a maximum number of retransmissions for the UCI. If the number of retransmissions exceeds the maximum retransmissions, the WTRU may stop, drop, or skip the UCI. The WTRU may stop, drop, or skip the retransmissions when the TSF sync information is reset. The WTRU may stop, drop, or skip the retransmissions when the time to the next reset is below a preconfigured threshold.

In examples, WTRU procedures may handle the error propagation issue for TSF compression with past CSI available at both the WTRU and NW. Example WTRU procedures are described for the error propagation problem, such as that caused by missing UCI, associated with TSF compression. The WTRU and the NW may use historical/past CSI for compression and/or reconstruction of CSI, respectively. For proper operation of the TSF compression, both WTRU and NW should be synchronized in terms of the usage of the past CSI. The following procedures may be agnostic to the TSF implementation framework and/or may be considered broadly applicable to handle the error propagation problem associated with TSF compression with both communication nodes having access to the past CSI and/or a representation thereof.

The WTRU may perform various actions/steps, including, for example, the WTRU may receive a configuration (e.g., configuration information) for CSI feedback based on TSF compression with past CSI used at both NW and WTRU in the compression process (e.g., using an AE model). The configuration information may include TSF parameters, which may include a number of parts involved in the compression process. For example, the compression process (e.g., TSF operation) may involve a single part that represents the compressed information generated based on the available past CSI along with the current CSI. Alternatively or additionally, the compression process (e.g., TSF operation) may involve two or more parts, where some parts capture long-term variations in the channel and other parts capture short-term variations in the channel.

TSF sync information between the WTRU and NW may be used for compression and decompression. For example, TSF sync information may include/represent the number and type of historical samples used for CSI generation/reconstruction, where historical samples may represent raw CSI, eigenvectors, a set of beams, etc. Additionally, TSF sync information may include the number of parts and associated sync information between the WTRU and NW (e.g., two parts where each part represents specific information about the channel). For example, the first part may represent a first set of beams, and the second part may represent a second set of beams.

In examples, monitoring parameters may be utilized to ensure proper TSF compression. The TSF sync information used at the WTRU and NW should always be in-sync. A monitoring flag, if configured, may indicate that the WTRU may start monitoring the TSF sync information between the WTRU and NW. Monitoring priority, if configured, may indicate that the WTRU may prioritize one part over the other when monitoring. NW-assistance information may indicate an NW action associated with the TSF sync information (e.g., NW update of the TSF sync information based on the WTRU feedback and/or an NW-based counter that is updated with every update of the TSF sync information. Criteria and conditions for out-of-sync detection and/or mitigation may include a correlation metric (e.g., Squared Generalized Cosine Similarity (SGCS) between consecutive samples and/or a metric associated with the TSF sync information, such as a predefined function of the TSF sync information).

A reporting configuration may include, for example, UL resources for monitoring parameters and/or synchronization handling. The WTRU may receive a CSI Reference Signal (CSI-RS) transmission, estimate the CSI, and/or store the estimated CSI and/or associated parameters (e.g., Angles of Arrival (AoAs) and/or Angles of Departure (AoDs) associated with the estimated CSI). The WTRU may update the TSF sync information between the WTRU and NW based on the estimated channel. For example, this may involve updating the buffer containing the CSI information by adding or removing samples or updating one or more parts associated with the TSF sync information by adding, removing, or replacing one or more parts.

The WTRU may determine one or more parameters associated with the TSF sync information monitoring. These parameters may include, for example, the misalignment status between the TSF sync information at the WTRU and NW, which may be either aligned or non-aligned. The non-aligned status may have two misalignment sub-levels (e.g., Level-1, Level-2). A Level-1 misalignment may occur if the WTRU updated the TSF sync information, but the NW missed the update (e.g., because of missing UCI). The Level-1 misalignment may be determined based on NW configured conditions and/or NW assistance information (e.g., NW counter). A level 2 misalignment may occur if both the WTRU and NW update their respective TSF sync information, but the NW/WTRU update is mismatched with the WTRU/NW update (e.g., because of a UCI error). The Level-2 misalignment may be determined based on NW configured conditions and/or NW assistance information, including, for example, being determined based on a calculated and/or reported/configured function/metric of the TSF sync information.

The parameters may include performance drop parameters and may indicate whether a performance drop occurs because of a misalignment associated with TSF sync information, a quality of historical samples, the compression model, and/or a combination of the compression model and past CSI quality. A performance drop because of misalignment may be based on a detected misalignment between TSF sync information. A performance drop because of the quality of past CSI may be based on a measured metric associated with the TSF sync information (e.g., a min correlation threshold associated with every pair of consecutive CSI in the buffer). A performance drop because of the model may be based on, for example, an out-of-distribution event (e.g., an out-of-range parameter, speed, Signal-to-Noise Ratio (SNR), etc.).

Examples include solutions for error propagation resolution through detection and mitigation of misalignment between the beam subsets at the WTRU side and gNB side. In the case of TSF BDP compression, the WTRU may receive a configuration for CSI feedback based on beam domain compression, such as using an Autoencoder (AE) model. The configuration may include several key components: beam domain configuration parameters, monitoring parameters, criteria/conditions for beam subsets and parameters determination, and/or a reporting configuration for UL resources for monitoring parameters.

The beam domain configuration parameters may include the number of beam subsets. The beam domain configuration parameters may include the minimum, maximum, and/or default number of selected beams for each subset. The beam domain configuration parameters may include the initial, default, maximum, and/or minimum beam validity time for each subset (e.g., indicating how long the same selected set of beams for each subset may be used for BDP/transformation). The beam domain configuration parameters may include the beam range threshold (e.g., defining the beam range associated with each subset). The beam domain configuration parameters may include the differential beam step threshold (e.g., defining the maximum allowed differential beam step).

The monitoring parameters may include a monitoring flag for each subset, subset monitoring priority, and/or a beam update/change flag. The beam update/change flag may be a binary value indicated/configured only if the NW performed a beam update in the stored beam subsets and may be two bits indicating whether the update is associated with the first subset, second subset, or both.

The criteria and conditions for beam subsets and/or parameters determination may include a correlation metric (e.g., Squared Generalized Cosine Similarity (SGCS) between consecutive samples), a speed threshold, and/or a Beam Domain Preprocessing (BDP) performance threshold.

The configuration information may include a reporting configuration. The reporting configuration may include UL resources for monitoring parameters.

The WTRU may receive a CSI-RS transmission, estimate the CSI, and store the estimated CSI and/or associated parameters (e.g., Angles of Arrival (AoAs), Angles of Departure (AoDs)) associated with the estimated CSI. The WTRU may select the beams associated with the BDP based on one or more of allocated uplink overhead, configured BDP performance threshold, configured number of selected set of beams, etc. The WTRU may determine a first subset of beams and a second subset of beams and associated parameters (e.g., a number of beams for each subset, validity time for each subset) based on, for example, a rate of change of channel parameters (e.g., based on a rate of change of AoAs/AoDs, or based on the measured validity time associated with each beam). The first subset of beams may include various properties. For example, the first subset of beams may have properties including being static (e.g., having a longer validity time relative to a second subset and/or being greater than the configured validity time threshold). The beam range associated with the first subset may be smaller than a configured threshold and may have a low differential beam step (e.g., less than a configured differential beam step threshold.

The second subset of beams may also include various properties. For example, the second subset of beams may include properties including being dynamic and being reported and/or updated more frequently relative to the first subset of beams, or less than the configured validity time threshold. The beam range associated with the second subset of beams may be greater than a configured threshold, and the beam change associated with the second subset of beams may have a high differential beam step (e.g., greater than a configured differential beam step threshold).

The WTRU may determine one or more parameters associated with the beam subset monitoring. These parameters may include, for example, the beam subset misalignment status and/or performance drop parameter(s). The beam subset misalignment status may be either aligned or non-aligned with two sub-levels, such as Level-1 misalignment (e.g., the WTRU updated the beams but the NW missed the update based on, for example, NW configured conditions, a beam update flag, and/or a NW-based counter) and Level-2 misalignment (e.g., both the WTRU and NW update the beams but the NW updates to the wrong beam based on the indicated beam step). The performance drop parameter may indicate whether a performance drop occurs because of BDP (e.g., beam misalignment) or beam domain model failure, based on, for example, a comparison of the reconstructed CSI with the original CSI.

The WTRU may perform one or more actions to mitigate beam subset misalignments based on the misalignment status. These actions may include performing a beam subset reset (retransmission of all beam subsets), resending the updated set from the previous update instant (using differential beam update), and periodic transmission of the beams with long validity time/period. The WTRU may report the beam subset monitoring parameters, such as beam subset misalignment status and mitigation actions (e.g., retransmission of the updated set).

The WTRU may determine the cause of a performance drop for TSF-based compression. The WTRU may receive a configuration (e.g., configuration information) for CSI feedback based on TSF compression with past CSI used at both NW and WTRU in the compression process, such as using an AE model. The configuration information may include WTRU-side TSF sync information configuration, criteria/conditions for performance monitoring, and/or a reporting configuration for UL resources for monitoring parameters and synchronization handling. The WTRU may receive a configuration for CSI feedback based on TSF compression with past CSI used at both NW and WTRU in the compression process, such as using an AE model. The configuration information may include WTRU-side TSF sync information configuration, criteria/conditions for performance monitoring, and/or a reporting configuration for UL resources for monitoring parameters and synchronization handling.

The WTRU-side TSF sync information configuration may include/represent the number and type of historical samples used for CSI generation/reconstruction, where historical samples may represent raw CSI, eigenvectors, or a set of beams. Additionally, the TSF sync information may include the number of feedback report parts and associated sync information between WTRU and NW, such as two feedback report parts where each part represents specific information about the channel. For example, the first feedback report part may represent a first set of beams, and the second feedback report part may represent a second set of beams. In examples, a single feedback report may represent the compressed information generated based on the available past CSI along with the current CSI. Alternatively, two or more feedback reports, which may include some feedback report parts that capture long term variations in the channel and other feedback report parts that capture short term variations in the channel. Additionally, for TSF compression using BDP, the first feedback report part may represent a first set of beams, and the second feedback report part may represent a second set of beams.

Criteria and conditions for performance monitoring may include a correlation metric (e.g., SGCS between consecutive samples, a speed threshold, and/or a BDP performance threshold. The configuration information may include a reporting configuration (e.g., an indication of the UL resources for monitoring parameters and/or synchronization handling).

The WTRU may receive one or more CSI-RS transmissions and may determine WTRU-side TSF sync information based on the received one or more CSI-RS transmissions. The WTRU may determine and report one or more CSI feedback report parts based on the determined WTRU-side TSF sync information and the received CSI-RS transmissions. The WTRU may monitor the performance of TSF feedback reporting and determine whether there is a drop in performance of TSF feedback reporting (e.g., a drop greater than a configured threshold amount).

The WTRU may determine the cause of the performance drop based on, for example, the performance drop parameter. The performance drop parameter may be determined based on measurements and/or a determination of misalignment between WTRU-side TSF sync information and NW-side sync information. Causes of performance drop may include misalignment (e.g., based on detected misalignment between TSF sync information), quality of historical CSI (e.g., based on measurements and configured criteria/conditions for performance monitoring, such as comparison of correlation between consecutive TSF sync information measurements to a configured threshold), and/or AI/ML model issues (e.g., based on measurements indicating an out-of-distribution event, such as out-of-range parameters, speed, SNR, etc.). The WTRU may report the determined cause of the performance drop.

The invention claimed is:

1. A method performed by a wireless transmit/receive units (WTRU) for synchronizing temporal-spatial-frequency (TSF) information for channel state information (CSI) feedback, the method comprising:

receiving configuration information, from a network (NW), the configuration information comprising network (NW)-assistance information associated with NW-side TSF sync information and a condition for detecting misalignment between WTRU-side TSF sync information and the NW-side TSF sync information;

determining that a misalignment event between the WTRU-side TSF sync information and the NW-side TSF sync information has occurred based on the NW-assistance information and the condition for detecting misalignment;

determining a misalignment mitigation action responsive to the determining that the misalignment event between the WTRU-side TSF sync information and the NW-side TSF sync information has occurred, the misalignment mitigation action comprising at least one of resetting the WTRU-side TSF sync information or retransmitting missing uplink control information (UCI); and sending a report, wherein the report comprises an indication that the misalignment event between the WTRU-side TSF sync information and the NW-side TSF sync information has occurred and an indication of the misalignment mitigation action.

2. The method of claim 1, wherein the WTRU-side TSF sync information comprises information associated with historical CSI measurements from the WTRU, and the NW-side TSF sync information comprises the information associated with the historical CSI measurements from the WTRU.

3. The method of claim 1, further comprising:

receiving CSI reference signal (CSI-RS) transmissions from the NW and generating CSI based on the received CSI-RS transmissions; and updating the WTRU-side TSF sync information based on the CSI, the updating comprising one or more of adding, removing, or replacing historical CSI samples in a buffer.

4. The method of claim 1, wherein the configuration information further comprises information indicating parameters for a number and a type of historical CSI samples associated with the WTRU-side TSF sync information; or wherein the configuration information comprises information indicating monitoring parameters for the WTRU-side TSF sync information, wherein the monitoring parameters comprise a monitoring flag that, when set, triggers the WTRU to determine whether the misalignment event between the WTRU-side TSF sync information and the NW-side TSF sync information has occurred.

5. The method of claim 1, further comprising performing the misalignment mitigation action by performing at least one of a reset of the WTRU-side TSF sync information to a most recent synchronized state with the NW or a partial removal of the WTRU-side TSF sync information.

6. The method of claim 1, wherein the NW-assistance information comprises:

a correlation metric for evaluating a similarity between consecutive CSI samples; or an output of an NW action associated with the NW-side TSF sync information, the output comprising at least one of:

an indication of the NW-side TSF sync information based on received WTRU feedback;

an indication of an output of a function performed on the NW-side TSF sync information;

an indication of an output of a function performed on the received WTRU feedback; or an indication of a status of a NW-side counter that is updated with every update of the NW-side TSF sync information.

7. The method of claim 1, wherein the condition for detecting misalignment between the WTRU-side TSF sync information and the NW-side TSF sync information comprises at least one of:

a measurement of a correlation between consecutive samples of the WTRU-side TSF sync information dropping or being below a correlation threshold;

a comparison of a function of the WTRU-side TSF sync information with a function of the NW-side TSF sync information resulting in a value exceeding a configured threshold;

reception of a monitoring flag from the NW indicating that the WTRU is to start monitoring the WTRU-side TSF sync information for alignment; or a status of a NW-side counter associated with updates to the NW-side TSF sync information indicating the misalignment.

8. The method of claim 1, wherein the misalignment event is a first type of misalignment event, and wherein the first type of misalignment event indicates that the NW-side TSF sync information was not updated due to missing at least one UCI transmission from the WTRU.

9. The method of claim 8, further comprising:

receiving an indication of a network side counter, and determining that the misalignment event is the first type of misalignment event based on the indication of the network side counter.

10. The method of claim 1, wherein the misalignment event is a second type of misalignment event, wherein the second type of misalignment event indicates that both the WTRU and NW update their respective TSF information but the update to the NW-side TSF sync information does not match the update to the WTRU-side TSF sync information; and wherein the method further comprises determining that the misalignment event is the second type of misalignment event based on a comparison between an output of a function based on the WTRU-side TSF sync information and an output of the function received from the network.

11. A wireless transmit/receive unit (WTRU) comprising:

a processor configured to:

receive configuration information, from a network (NW), the configuration information comprising network (NW)-assistance information associated with NW-side TSF sync information and a condition for detecting misalignment between WTRU-side TSF sync information and the NW-side TSF sync information;

determine that a misalignment event between the WTRU-side TSF sync information and the NW-side TSF sync information has occurred based on the NW-assistance information and the condition for detecting misalignment;

determine a misalignment mitigation action responsive to the determining that the misalignment event between the WTRU-side TSF sync information and the NW-side TSF sync information has occurred, the misalignment mitigation action comprising at least one of resetting the WTRU-side TSF sync information or retransmitting missing uplink control information (UCI); and send a report, wherein the report comprises an indication that the misalignment event between the WTRU-side TSF sync information and the NW-side TSF sync information has occurred and an indication of the misalignment mitigation action.

12. The WTRU of claim 11, wherein the WTRU-side TSF sync information comprises information associated with historical CSI measurements from the WTRU, and the NW-side TSF sync information comprises the information associated with the historical CSI measurements from the WTRU.

13. The WTRU of claim 11, wherein the processor is further configured to:

receive CSI reference signal (CSI-RS) transmissions from the NW and generating CSI based on the received CSI-RS transmissions; and update the WTRU-side TSF sync information based on the CSI, the updating comprising one or more of adding, removing, or replacing historical CSI samples in a buffer.

14. The WTRU of claim 11, wherein the configuration information further comprises parameters for a number and a type of historical CSI samples associated with the WTRU-side TSF sync information; or wherein the configuration information comprises monitoring parameters for the WTRU-side TSF sync information, wherein the monitoring parameters comprise a monitoring flag that, when set, triggers the WTRU to determine whether the misalignment event between the WTRU-side TSF sync information and the NW-side TSF sync information has occurred.

15. The WTRU of claim 11, wherein the misalignment mitigation action comprises performing at least one of a reset of the WTRU-side TSF sync information to a most recent synchronized state with the NW or a partial removal of the WTRU-side TSF sync information.

16. The WTRU of claim 11, wherein the NW-assistance information comprises:

a correlation metric for evaluating a similarity between consecutive CSI samples; or an output of an NW action associated with the NW-side TSF sync information, the output comprising at least one of:

an indication of the NW-side TSF sync information based on received WTRU feedback;

an indication of an output of a function performed on the NW-side TSF sync information;

an indication of an output of a function performed on the received WTRU feedback; or an indication of a status of an NW-side counter that is updated with every update of the NW-side TSF sync information.

17. The WTRU of claim 11, wherein the condition for detecting misalignment between the WTRU-side TSF sync information and the NW-side TSF sync information comprises at least one of:

a measurement of a correlation between consecutive samples of the WTRU-side TSF sync information dropping below a correlation threshold;

a comparison of a function of the WTRU-side TSF sync information with a function of the NW-side TSF sync information resulting in a value exceeding a configured threshold;

reception of a monitoring flag from the NW indicating that the WTRU should start monitoring the WTRU-side TSF sync information for alignment; or a status of a NW-side counter associated with updates to the NW-side TSF sync information indicating the misalignment.

18. The WTRU of claim 11, wherein the misalignment event is a first type of misalignment event, and wherein the first type of misalignment event indicates that the NW-side TSF sync information was not updated due to missing at least one UCI transmission from the WTRU.

19. The WTRU of claim 18, wherein the processor is further configured to receive an indication of a network side counter, and determine that the misalignment event is the first type of misalignment event based on the indication of the network side counter.

20. The WTRU of claim 11, wherein the misalignment event is a second type of misalignment event, wherein the second type of misalignment event indicates that both the WTRU and NW update their respective TSF information but the update to the NW-side TSF sync information does not match the update to the WTRU-side TSF sync information; and wherein the processor is further configured to determine that the misalignment event is the second type of misalignment event based on a comparison between an output of a function based on the WTRU-side TSF sync information and an output of the function received from the network.

* * * * *